US005695806A

United States Patent [19]

Bateman

[11] Patent Number: 5,695,806
[45] Date of Patent: Dec. 9, 1997

[54] FAT SUBSTITUTE FOR ONE-TO-ONE REPLACEMENT

[75] Inventor: Kristine Bateman, Rigby, Id.

[73] Assignee: Mrs. Bateman's Bakery, L.C., Rigby, Id.

[21] Appl. No.: 516,868

[22] Filed: Aug. 18, 1995

Related U.S. Application Data

[63] Continuation-in-part of Ser. No. 223,290, Apr. 5, 1994, abandoned, which is a continuation-in-part of Ser. No. 76,318, Jun. 11, 1993, abandoned.

[51] Int. Cl.$^6$ .................................................... A23D 7/00
[52] U.S. Cl. ........................ 426/581; 426/658; 426/804
[58] Field of Search .................................. 426/658, 530, 426/804, 581

[56] References Cited

U.S. PATENT DOCUMENTS

| | | |
|---|---|---|
| 3,207,609 | 9/1965 | Gorman et al. |
| 3,799,805 | 3/1974 | Sugimoto |
| 3,962,465 | 6/1976 | Richter et al. |
| 3,986,890 | 10/1976 | Richter et al. |
| 4,188,412 | 2/1980 | Sejpal |
| 4,380,555 | 4/1983 | Campagne et al. |
| 4,510,166 | 4/1985 | Lenchin et al. |
| 4,536,408 | 8/1985 | Morehouse et al. |
| 4,594,255 | 6/1986 | Wilson et al. |
| 4,640,837 | 2/1987 | Coleman et al. |
| 4,643,907 | 2/1987 | Player et al. |
| 4,645,674 | 2/1987 | Lang et al. |
| 4,668,519 | 5/1987 | Dartey et al. |
| 4,752,494 | 6/1988 | Tang et al. |
| 4,789,664 | 12/1988 | Seligson et al. |
| 4,818,553 | 4/1989 | Holscher et al. |
| 4,857,354 | 8/1989 | Ishida et al. |
| 4,861,604 | 8/1989 | Tang et al. |
| 4,861,609 | 8/1989 | Willard et al. |
| 4,869,919 | 9/1989 | Lowery |
| 4,906,490 | 3/1990 | Bakal et al. |
| 4,913,919 | 4/1990 | Cornwell et al. |
| 4,917,915 | 4/1990 | Cain et al. |
| 5,082,682 | 1/1992 | Peterson |
| 5,082,684 | 1/1992 | Fung |
| 5,085,877 | 2/1992 | Youcheff et al. |
| 5,128,161 | 7/1992 | Smith |
| 5,275,837 | 1/1994 | Eastman |
| 5,372,835 | 12/1994 | Little et al. |
| 5,374,442 | 12/1994 | Harris et al. |
| 5,376,399 | 12/1994 | Dreese et al. |
| 5,378,491 | 1/1995 | Stanley et al. |
| 5,470,391 | 11/1995 | Mallee ................... 127/38 |
| 5,547,513 | 8/1996 | Mallee ................... 426/658 |
| 5,576,043 | 11/1996 | Stankus ................. 426/804 |
| 5,584,937 | 12/1996 | Finocchiaro ............ 426/658 |

FOREIGN PATENT DOCUMENTS

| | | |
|---|---|---|
| 0218277 | 9/1986 | European Pat. Off. |
| 0443844 | 8/1991 | European Pat. Off. |
| 0566428 | 10/1993 | European Pat. Off. |
| 9421128 | 9/1994 | WIPO |

OTHER PUBLICATIONS

Fat-Reduced Pie Crust Food Technology May 1993 p. 126.
Maltodextrins Food Technology Sep. 1992 p. 127.
Potato Starch Food Technology Oct. 1991 p. 126.
Rice–Derived Ingredient... Food Technology Aug. 1991, p. 264.
Cabohydrate–Based Ingredient... Food Technology Aug. 1991, p. 262.
Blend replaces shortening to produce Low Calorie Cake: Food Engineering, Nov. 1983.
Elements of Food Technology, 1977, pp. 416–419.
Replacement of Shortening by Maltodextrin–Emulsifier Combinations in Chocolate Layer Cakes.
Cereal Foods World, Dec. 1991, vol. 36, No. 12, pp. 1017–1026.
Woman's Day Encyclopedia of Cookery, vol. 2, p. 262.
World Book Encyclopedia, 1988 Ed., pp. 518–519.
Encyclopedia of Polymer Science and Technology, vol. 12, pp. 818–849.
Gelatinization of Starch and Mechanical Properties of Starch Pastes, Starch, 2nd ed, pp. 285–297, 312–313, 487, 581–582, 670–673.
Encyclopedia of Chemical Technology, 3rd ed., vol. 21, pp. 492–505.
Fat Replacement Using Maltrin Maltodextrins, Grain Processing Corporation, pp. 1–3.
Optimizing Texture of Reduced–Calorie Yellow Layer Cakes, Cereal Chemistry, pp. 338–342.
Effects of Emulsifiers, Sorbitol, Polydextrose, and Crystalline ellulose on the Texture of Reduced–Calorie Cakes, Journal of Texture Studies 19 (1988), pp. 307–320.
Hydrocolloids and the search for the "Oily Grail", Food Technology, Oct. 1991, pp. 94–103.
Emulsifier/Oil System for Reduced Calorie Cakes, Jaocs. vol. 66, No. 4 (Apr. 1989), pp. 537–542.
Shortening Replacement in Cakes, Food Technology—Mar. 1988, pp. 114–117.
Maltodextrins: Production, Properties, and Applications, Chemical Abstracts, 117, 1192, pp. 233–275.
Polydextrose for Reduced Calorie Foods, Cereal Foods World/pp. 515–518.
Maltodextrins in Reduced Calorie Foods, A. L. Morehouse, Grain Processing Corporation, Muscatine, Iowa.
Structure of Amylose End Group Analysis, Sec. 39.8, p. 1331, Organic Chemistry (Morrison & Boyd 5th Ed. 1987).

*Primary Examiner*—Carolyn Paden
*Attorney, Agent, or Firm*—Hopkins Roden Crockett Hansen & Hoopes, PLLC

[57] ABSTRACT

A low fat substitute fat food stuff mixture and method for making the same is disclosed, the mixture substantially simulating the appearance, taste, texture, and mouth feel of traditional fat-filled foods. The mixture can be easily substituted in one to one proportions for butter, margarine, shortening, oil, lard and other fats called for in many foods.

24 Claims, No Drawings

FAT SUBSTITUTE FOR ONE-TO-ONE REPLACEMENT

BACKGROUND

This application is a continuation-in-part from a previous application filed on Apr. 5, 1994, Ser. No. 08/223,290, now abandoned which is a continuation-in-part from an application filed Jun. 11, 1993, Ser. No. 08/076,318 now abandoned.

FIELD

This invention is in the field of fat substitutes and products containing fat substitutes, yet, as opposed to prior art fat substitutes, employs an easily manipulated mixture which can be substituted on a one-to-one basis for many different kinds of fats in foods, including shortening, margarine, butter, oil, lard, cream cheese and other kinds of fats and relies on butter as an emulsifier, rather than selecting a different emulsifier for each food selected.

PRIOR ART

Fat enhances the intake of air during the mixing of foods and helps food products leaven. Also, fat provides the food product with a desired consistency. While fat is a key element of a food's structure, taste and texture, it contains many calories. Thus, the challenge facing fat substitutes is to reduce fat calories while retaining structure, taste and texture.

The prior art discloses a number of attempts to lower the percentage of fat in edible products by replacing fat with carbohydrate based products, including starches and maltodextrins, referred to collectively as saccharide polymers. Maltodextrins act as bulking agents, taking the place of many of the physical characteristics of fats, but containing as many as 5 fewer calories per gram of dry edible product. Similarly, pregelatinized starches act as bulking agents.

Starches, including corn starch, potato starch, rice starch, and tapioca starch can be converted to water-soluble starches, including pregelatinized starches. These and other starches can also be converted to non-sweet nutritive saccharide polymers, including maltodextrins, through a process involving heat, gelatinization, hydrolysis, and additional refining. Maltodextrins are among the possible resulting partial hydrolyzates of various starches and have been defined by the U.S. Food and Drug Administration ("FDA") as non-sweet nutritive saccharide polymers that consist of D-glucose units linked primarily by alpha 1,4 bonds having a dextrose equivalence (DE) less than 20. According to the FDA, maltodextrins are prepared as a dry powder "with safe and suitable acids and enzymes."

Dextrose equivalence reflects the amount of hydrolysis performed upon the starch and measures the amount of reducing sugar in each compound, 0 being the reducing sugar content of starch and 100 being the reduction power of dry glucose. As DE increases, freezing point depression, hygroscopicity, solubility, and osmolality increase, and molecular weight decreases. The lower the DE, the closer the maltodextrin is to starch. The higher the DE, the closer the maltodextrin is to corn syrup.

Starches can undergo physical changes, including pregelatinization, which increase the water solubility of the starch. Pregelatinized starches have no DE. Combining a maltodextrin with a starch decreases the dextrose equivalence of the overall product and decreases the product's stickiness and yields a full-bodied consistency. For example, a combination of rice maltodextrin DE-10 and potato modified starch pregelatinized, together which small amounts of whey protein and xanthum gum is known in the art and has been commercially available for years. The combination has a DE equivalent of 3. Adding starch, however, tends to make the product more viscous. Finding a proper balance between starch and maltodextrin is difficult and requires experimentation and testing.

Since these characteristics define various foods, the selection of the proper maltodextrin and/or starch is pivotal for the proper texture and consistency of foods. For example, freezing point depression is a key aspect of frozen confections and varying the number of molecules in solution by varying the DE of the overall mixture affects the freezing point of various desserts.

In prior art fat replacement systems, replacement of the fats in foods with mere maltodextrins provided an unsatisfactory texture. One explanation for the texture loss in low-fat or no-fat cakes lacking an emulsifier in addition to maltodextrin was the protein denaturation caused by maltodextrin. As a result, emulsifiers were combined with maltodextrins in an attempt to improve the fat replacer's textural qualities. However, the prior art failed to reveal a universal emulsifier which can be used in conjunction with maltodextrin as a fat replacement for various foods.

The substitution on a one-to-one basis of maltodextrins and one type of emulsifier for the fat in a variety of foods is desireable because the resulting fat substitute can replace butter, shortening, oil, and other forms of fat in foods with a single emulsifier. However, the prior art revealed no low-fat formula which used a single emulsifier together with the proper combination of saccharide polymers and water and which provided a universal textural quality such that it could be used on a one-to-one basis as a replacement for the different kinds of fat in various foods, including bakery goods, cookies, breads, meats, candies, chocolates, cakes, dough, stuffings, sauces, and uncooked products without varying the emulsifier or the formula used for each different food. The problem of what emulsifier to combine with maltodextrin was particularly acute with regard to bakery goods which are more complex than frozen desserts.

Eastman, U.S. Pat. No. 5,275,837, disclosed the production of an acid-modified starch which may act as an ingredient in a fat substitute, and cited the usefulness of a fat substitute which can be employed in a variety of foods. However, Eastman failed to provide directions for employing the acid-modified starch as a fat substitute. No specific directions regarding the composition of the envisioned fat substitute were given. Finally, although claim 1 indicated that the reaction producing the granular starch product occurred under "conditions sufficient to cleave at least 20% of the terminal amylose groups," it was unclear how this value was to be determined.

SUMMARY AND OBJECTS OF THE INVENTION

An object of this invention is to provide the specific formula for a fat replacement capable of replacing fat in a variety of food products without totally revamping the recipe for the food, yet produce a substantially similar food product rendered thereby in terms of taste and texture as if normal fat were used.

Another object of the invention is to accomplish this one-to-one replacement using only one emulsifier, creating a fat replacement which can be universally applied in a variety of foods.

A further object of this invention is to create a fat replacement which is shelf stable such that the fat replacement can be sold in buckets and substituted by home bakers and/or commercial manufacturers on a one-to-one basis for the fat in a variety of different foods.

The applicant has discovered that a reduced amount of butter, in combination with maltodextrins, along with water, in the ranges disclosed herein, balances the goals of achieving textural and taste integrity and replacing the fat in a variety of foods on a one-to-one basis without otherwise reformulating the recipe for the food, yet produces a substantially similar food product rendered thereby in terms of texture as if normal fat were used.

A substantially reduced amount of real butter is used because of the taste provided by butter, because it contains no hydrogenated oils and few, if any, trans-fatty acids, and because it is a natural, universal emulsifier when combined with maltodextrins. As demonstrated by the recipes in Appendix A, a reduced amount of butter, in combination with maltodextrins and water is capable of replacing butter as well as non-butter fats, including shortening and oils.

While the applicant's invention may be made with maltodextrins derived from a variety of starches, including, for example, corn maltodextrin or rice maltodextrin, a combination of corn and rice maltodextrin is preferred.

Higher DE maltodextrins are more soluble and refined than granular acid-modified starches and other lower DE starch hydrozylates. Granular starch derivatives and lower DE starch hydrozylates are not as soluble in cool water as higher DE starch hydrozylates.

Applicant's embodiments include maltodextrins having a DE of less then 20. Applicant's embodiments also include maltodextrins having a DE of 6 or more but less than 10, as well as maltodextrins having a DE of more than 10, but less than 20.

In order to receive the maximum textural quality, however, the preferred combination of saccharide polymers is one or more maltodextrin having a DE of 10. The most preferred combination is comprised of (1) corn maltodextrin DE-10 and (2) rice maltodextrin DE-10; and a pregelatinized starch. Possible pregelatinized starches include potato modified pregelatinized starch and a pregelatinized starch derived from corn, as well as many other pregelatinized starches. Other possible maltodextrins, although not preferred, may be employed as substitutes or in combination with the rice maltodextrin DE 10 and corn maltodextrin DE 10. Rice maltodextrin is not as sticky as corn maltodextrin and adds variety to the corn maltodextrin, enhancing texture.

The invention also includes an additional texture enhancer in the range of up to about 4 percent by weight, preferably whey protein, a water absorber and xanthum gum, a thickener. The preferred whey protein contains at least 50% protein by weight.

Since the present invention is designed for foods, it is desirable to generate a product with a pleasing color and a long shelf life at room temperature. Yellow food coloring may be added to the fat substitute to create the appearance of butter. Furthermore, the addition of a small amount of calcium propionate prevents the growth of mold while the addition of small amounts of sodium benzoate prevents the build up of yeast. To enhance shelf life, it is desirable to have a fat substitute which has a pH of 4.5. Citric acid or an equivalent pH adjuster may be added until a pH of 4.5 is achieved. The resulting fat substitute generally does not require refrigeration, but for shelf life over an extended period time, such as six months, refrigeration is recommended.

A method for making the mixture is also claimed which can be performed at cool temperatures. In the present invention, butter is added at room temperature so that it will disperse quickly through the mixture.

The method of this invention greatly reduces the technical expertise necessary to replace high fat with lower fat in various types of foods and still substantially maintain the flavor, taste, texture tenderness, moisture, mouth feel, and appearance of the high fat counterpart. This method of fat substitution is particularly useful in commercial baking where appearance and taste are essential in selling the product.

While many low-fat substitute products fail to brown well and become crispy on the top while remaining doughy in the middle, the low fat substitute products made with the mixture described and claimed in this application brown well and overcome these negative characteristics.

Features distinguishing this invention include that it does not have to be refrigerated, but is shelf stable and is sold in containers which cooks and home bakers can store in their pantry or shelves. In a variety of foods, where a recipe calls for a form of fat including shortening, margarine, butter, oil, lard, cream cheese and other kinds of fats, a cook can use this invention rather than the fat called for in the recipe and in the same amount as the fat called for in the recipe without otherwise reformulating the recipe for the food. Applicant's invention is particularly useful in replacing fat in bakery products, but can also be employed as a fat substitute in a variety of foods.

DETAILED DESCRIPTION

In a first embodiment, a low fat substitute fat food stuff mixture for use in making foods is employed comprising butter in the range of about 1 percent to about 40 percent by weight, maltodextrin in the range of about 40 percent to about 80 percent by weight, and water in the range of about 5 percent to about 50 percent by weight. Water is more preferably added in the range of about 5 percent to about 40 percent by weight. In addition, a water soluble starch is preferably added in the range of about 1 to about 15 percent by weight (preferably a pregelatinized starch).

Although the first embodiment contains significantly less than half the fat normally called for in recipes, this embodiment replaces fat in a wide variety of foods, including foods which demand a higher amount of fat, such as croissants and cream puffs, as well as foods which can tolerate drastic fat reductions, including bakery products, frostings, candies, toppings, ice creams, sauces, uncooked foods, brownies, cheese cakes, carrot cakes, chocolate cakes, muffins, cookies, breads, bun dough, main dishes, soups, cream sauces, pies, the foods described in Appendix A, and related foods.

In a second embodiment, maltodextrin exists in the range of about 40 percent to about 60 percent, while butter exists in the range of about 1 percent to 15 percent by weight, and water is present in an amount of about 25 percent to about 40 percent by weight. A water soluble starch is preferably added in the range of about 1 to about 15 percent by weight (preferably a pregelatinized starch).

The second embodiment is designed for a variety of foods which can tolerate drastic fat reductions, including bakery products, including frostings, candies, toppings, ice creams, sauces, uncooked foods, brownies, cheese cakes, carrot cakes, chocolate cakes, muffins, cookies, breads, bun dough, main dishes, soups, cream sauces, pies, the foods described in Appendix A, and related foods. While it is impossible to describe each of the foods for which either embodiment is successful, simple testing by those skilled in the art reveals which foods can tolerate the fat reductions contemplated by each.

In order to make the mixture, the ingredients in either the first or second embodiment are mixed together. The following ingredients are preferably also mixed with the ingredients in either the first or second embodiment: whey protein in an amount by weight of up to about 2 percent by weight, xanthum gum in an amount by weight of up to about 2 percent by weight, dried butter in the amount of up to about 1 percent by weight, and preservatives in an amount of up to about 1 percent by weight are mixed in with the above ingredients for improved shelf life, taste, texture, and presentation. Butter should be used at room temperature so that it will be soft and other ingredients will disperse through the product quickly. Butter, particularly cold butter, can be softened through a variety of processes, such as creaming.

The following ingredients are also mixed in with the above ingredients to improve taste, pH, and color: (1) artificial flavoring in the range of up to about 10 percent by weight; (2) food coloring in the range of up to 1 percent by weight to enhance butter-like appearance, the food coloring being either beta carotene or FD&C yellow no. 5 (beta carotene is added in the preferred embodiment); and (3) a pH adjuster in an amount necessary to adjust the pH of the mixture to 4.5, which is preferred. Salt may also be mixed in with the above ingredients as a preservative and soybean salad oil may be added to assist in the process of manufacture.

One skilled in the art will easily determine that artificial flavoring serves as flavoring means to supply a favorable taste to the particular food. Other ingredients may serve the same function and therefore fall within the scope of the appended claims, such as flavoring oils. Also, other food coloring agents may be used as food coloring means.

The ingredients are mixed on a higher speed, preferably 109 revolutions per minute, until the butter is completely dispersed. To prevent spillage, certain mixers with a smaller capacity require that the mixture be mixed at a slow speed, preferably about 60 revolutions per minute, for 1 minute, before the mixture is mixed at the higher speed. Cool water is preferred while mixing to prevent lumps. Adding hot water may even be detrimental. Cool water, commonly recognized as tap water from the cold faucet in a cooks's kitchen at home or business, is also less expensive to supply than hot water. The mixture should then preferably be allowed to set up overnight and may then be used as an ingredient in foods as a fat replacement for the fat in the foods.

Unlike other prior art references, which require chilling or heating of the fat replacement mixture, this mixture may generally be created, used, and stored at room temperature, without heating, maximizing efficiency and effort. Chilling the mixture is not recommended for mixing, unless the underlying recipes of certain foods, such as pie crusts and croissants, call for cold fat.

When the product is manufactured on a large quantity basis several steps are preferably taken to ensure proper mixing and preservation. After setting the agitators to about 170 RPM, the water is added. Calcium Propionate, Sodium Benzoate, and Citric Acid are then added and mixed until the ingrediants are in solution. STELLAR 100X, a commercially-produced pregelatinized starch is added slowly and mixed for five minutes at about 220 RPM. Salt is then added, after which whey, butter flavor, and dehydrated butter are added. The agitation may be increased to 300 RPM, or left at 220 RPM, after which the maltodetrins are added slowly and mixed until the lumps are removed, after which agitators are reduced to 220 RPM if they were increased. Butter, which is preferably left in a tempering room the night before production, is then added along with Xanthum Gum slurried in soybean salad oil. The beta carotene (previously dissolved in warm water) is then added, after which commercially produced pregelatinized starch INSTA-CLEAR GEL is added and the mixing is continued until the batch is a uniform slurry. The mixture is then pumped to a filler at 126 to 130 RPM agitation.

Since fat helps products leaven, and the disclosed fat substitute removes a great deal of the fat, once the fat substitute is made, it is preferred to add the fat substitute to ingredients in recipies without overmixing. When recipies are used containing separated eggs, sugar, and other ingredients, such as a recipe from scratch or typically used by a home baker, it is preferred to mix the fat substitute at room temperature with the eggs and the sugar, such as with a spoon, until almost smooth, then add the remaining ingredients in the recipe and mix until all the ingredients are combined, then stop, rather than continuing to mix.

When employing recipies containing a pre-mix, i.e. the sugar and other ingredients are already combined, it is preferred to mix the fat substitute until almost smooth, then scrape the sides of the bowl so that the fat substitute congregates to the middle of the bowl, then add the pre-mix, plus the water, and mix until all the ingredients are combined.

Formula A is the applicant's most preferred formula for foods which can tolerate drastic fat reductions, such as the foods described in Appendix A and related foods. Formula A can be widely substituted on a one-to-one basis for the shortening, butter, or oil in many different foods. Other less preferred, yet highly successful formulas which can be employed for the same purpose as Formula A are described in Appendix B.

| Formula A | |
|---|---|
| Ingredients | % by weight |
| Butter | 6.8 |
| Maltodextrin | |
| Maltodextrin Corn DE 10 | 50.1 |
| Maltodextrin Rice DE 10 | 1.2 |
| Pregelatinized Starch | |
| Stellar 100× | 2 |
| Instant Clear Gel-Starch | 3 |
| Water | 34.6 |
| Dried Butter | .5 |
| Vitamin: 1% Beta Carotene | .02 |
| Calcium Propionate | .1 |
| Sodium Benzoate | .1 |
| Whey Protein | .3 |
| Xanthum Gum | .07 |
| Salt (preservative) | .4 |
| Soybean Salad Oil | .4 |
| Optional: Citric Acid | (As needed) |
| Butter Flavoring | .093 |

When using Formula A, one cup of the fat substitute contains only 13 grams of fat and 624 calories, while one cup of butter contains 176 grams of fat and 1633 calories. Cholesterol content is 35 mg versus 299 mg found in one cup of butter. In addition, the mixture employs no hydrogenated oils and very little, if any, trans-fatty acids and contains less than 12% of the cholesterol found in real butter.

The recipes in Appendix A demonstrate the versatility of the low-fat substitute, known in the Appendices the Fat Replacement Mixture. As seen in some of these recipes, the use of egg whites and skim milk rather than whole eggs and whole milk is preferred for additional fat reduction, but is not necessary for successful employment of the fat replacement. When a recipe calls for one egg, it is preferred that ¼ cup of egg whites is employed instead.

Formula B is provided to demonstrate that it is possible to drastically reduce fat even in foods such as croissants which require a formula which is less viscous, more readily chilled and manipulated and therefore higher in fat:

| Formula B | |
|---|---|
| Ingredients | % by weight |
| Butter | 27 |
| Maltodextrin | |
| Maltodextrin Corn DE 10 | 46 |
| Maltodextrin Rice DE 10 | 6 |
| Pregelatinized Starch | 8 |
| Water | 10.7 |
| Dried Butter | 1 |
| Yellow Food Coloring | .001 |
| Calcium Propionate | .02 |
| Sodium Benzoate | .06 |
| Whey Protein | .5 |
| Xanthum Gum | .2 |
| Optional Citric acid | (As needed) |

Flavoring may also be added in an amount comprising approximately 0.08 percent by weight. For even less fat, the amount of butter in the formula can be reduced to 20%, increasing each of the other percentages proportionately. Formula B can also be used to produce low-fat creme puffs.

Appendix A and B are incorporated in their entirety herein by reference. The invention may be embodied in other specific forms without departing from its spirit or essential characteristics. The described embodiments are to be considered in all respects only as illustrative and not restrictive. The scope of the invention, therefore, is indicated by the appended claims rather than by the foregoing description. All changes which come within the meaning and range of equivalency of the claims are to be embraced within their scope.

I claim:

1. A low fat, substitute fat food stuff mixture for use in making laminated doughs and other food products, comprising:

maltodextrin in the range of about 40 percent to about 80 percent by weight, at least one pregelatinized water soluble starch in the range of about 1 percent to about 15 percent by weight, water in the range of about 5 percent to about 45 percent by weight, and butter in the range of about 1 percent to about 27 percent by weight, wherein the mixture is an oil-in-water emulsion and such that the mixture is substituted for normal fat in a food product in a one-to-one ratio without further altering the recipe for the particular food product, and such that a substantially similar food product is rendered thereby in terms of texture as if normal fat were used.

2. A low fat, substitute food staff mixture as in claim 1, wherein maltodextrin is in the range of about 42 percent to about 60 percent by weight and water is in the range of about 5 percent to about 30 percent by weight.

3. A low fat substitute fat food stuff mixture as in claim 1, wherein the water is cool when the mixture is produced.

4. A low fat substitute fat food stuff mixture as in claim 1, wherein the maltodextrin is selected from the group consisting of corn maltodextrin and rice maltodextrin and combinations thereof.

5. A low fat substitute fat food stuff mixture for use in making foods as in claim 1, wherein the maltodextrin has a dextrose equivalent of more than 6, but less than 20.

6. A low fat substitute fat food stuff mixture as in claim 1, wherein the maltodextrin has a dextrose equivalent of 10 or more, but less than 20.

7. A low fat substitute fat food stuff mixture for use in making foods as in claim 1, wherein the maltodextrin is comprised of corn maltodextrin DE-10 and rice maltodextrin DE-10.

8. A low fat substitute fat food stuff mixture as in claim 1, further comprising:

dried butter in the range of up to about 1 percent by weight, and food coloring in the range of up to about 1 percent by weight.

9. A low fat substitute fat food stuff mixture as in claim 1 further comprising at least one food preservative of up to about 1 percent by weight to ensure a longer shelf life.

10. A low fat substitute fat food stuff mixture as in claim 1 further comprising at least one means for enhancing texture, in the range of up to about 4 percent by weight, said means for enhancing texture selected from the group consisting of whey protein and xanthum gum.

11. A low fat substitute food stuff mixture as in claim 1, further comprising a means for adjusting the pH of the mixture.

12. A low fat substitute fat food stuff mixture as in claim 1, wherein the food product is a bakery product.

13. A low fat, substitute food staff mixture as in claim 1, wherein butter is in the range of about 1 percent to about 15 percent by weight.

14. A low fat substitute fat food staff mixture for use in making foods, comprising:

butter in the range of about 1 percent to about 15 percent by weight, at least one pregelatinized water soluble starch in the range of about 1 percent to about 15 percent by weight, maltodextrin in the range of about 40 percent to about 60 percent by weight, and water in the range of about 25 percent to about 40 percent by weight, such that the mixture is substituted for normal fat in a food product in a one-to-one ratio without further altering the recipe for the particular food product, and such that a substantially similar food product is rendered thereby in terms of texture as if normal fat were used.

15. A low fat substitute fat food stuff mixture as in claim 14, wherein the pregelatinized water soluble starch is a pregelatinized, potato modified starch.

16. A low fat substitute fat food stuff mixture as in claim 14, wherein the food product is a bakery product.

17. A low fat substitute fat food stuff mixture as in claim 14, wherein butter is present in an amount of about 5 to about 10 percent by weight.

18. A method for creating a low fat substitute fat food stuff mixture for use in making foods, comprising the steps of:

mixing together maltodextrin in the range of about 40 percent to about 80 percent by weight, water in the amount of about 5 percent to about 45 percent by weight, at least one pregelatinized water soluble starch in the amount of about 1 percent to about 15 percent by weight, and butter in the range of about 1 to about 27 percent by weight, to form a mixture, and wherein the mixture is an oil-in-water emulsion.

19. A method for creating a low fat substitute fat food stuff mixture as in claim 18, further comprising the step of mixing dried butter in the amount of up to about 1 percent by weight, food coloring in the amount of up to about 1 percent by weight, preservatives in an amount of up to about 1 percent by weight, whey protein in an amount of up to about 2 percent by weight, xanthum gum in an amount of up to about 2 percent by weight.

20. A method as in claim 18, wherein the fat food stuff is creamed at approximately 109 revolutions per minute, and the mixing of the emulsion is accomplished at approximately 109 revolutions per minute.

21. A method as in claim 18 wherein the water is cool when the mixture is mixed.

22. A method as in claim 18, wherein the maltodextrin is present in the amount of about 42 percent to about 60 percent and the water is present in the amount of about 5 percent to about 30 percent by weight.

23. A method as in claim 18 wherein butter is present in the range of about 1 percent to about 15 percent by weight, water is present in the amount of about 25 to about 40 percent by weight, and maltodextrin is present in the range of about 40 percent to about 60 percent by weight.

24. A method as in claim 18, wherein the butter is present in the amount of about 1 percent to about 15 percent by weight.

* * * * *